Patented Nov. 21, 1933

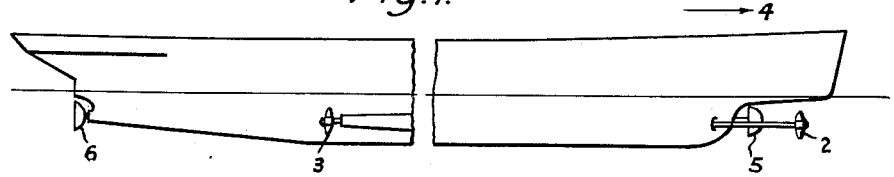
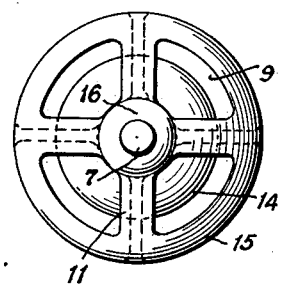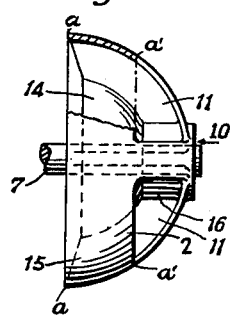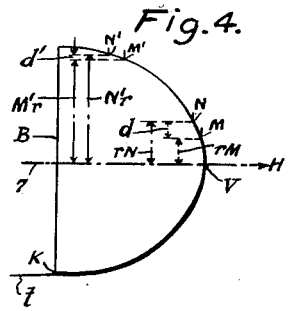
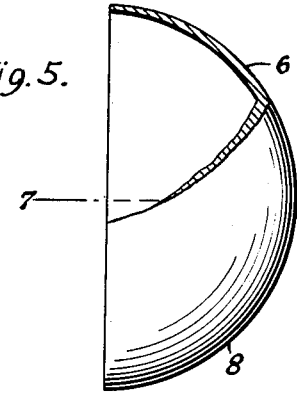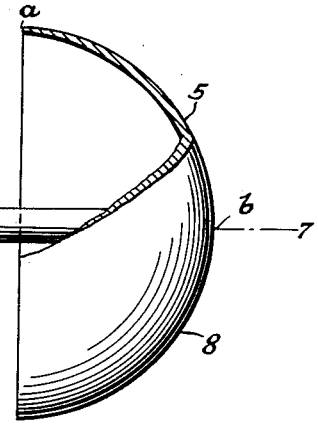
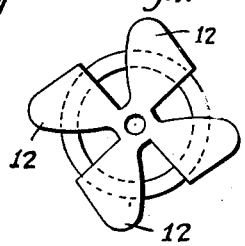
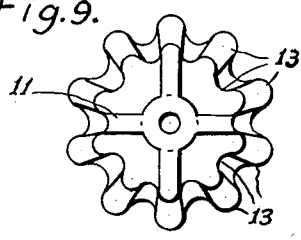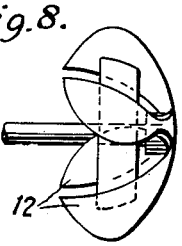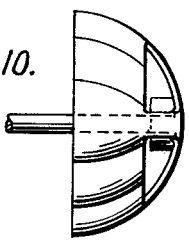
INVENTOR
LUIGI GHIRARDI
By Haseltine Lake & Co.

1,936,053

UNITED STATES PATENT OFFICE 1,936,053

PROPELLING AND STEERING DEVICE

Luigi Ghirardi, Genoa, Italy

Application February 10, 1928, Serial No. 253,480, and in Italy August 29, 1927

15 Claims. (Cl. 170—159)

This invention relates to improvements in propelling and steering devices for a vessel and more particularly to devices which may be applied to the vessels in conjunction with the usual propelling devices or which may operate to drive the vessel independently.

The present invention has for its object the provision of a new means for propelling a vessel.

Another object of this invention is the provision of a means for steering a vessel which allows the course thereof to be changed at will without retarding the forward motion.

The invention is based on the observed principle that the rotation about a substantially horizontal axis of certain bodies of revolution when immersed in a fluid will result in imparting a definite traveling motion to such bodies in line with the axes thereof. These special bodies of revolution contemplated are those generated from a straight line inclined to the axis or certain second degree lines such as semi-circles and parabolas which have the vertices thereof coincident with the axis of rotation, the portions of said bodies, which in the present invention are actually centrifugal propellers, may include a fundamental or main body of revolution and paddle blades having arcuate or curved lines, each of which may be generated by one of the aforesaid lines, considered as pertaining to or part of the similar revolution bodies which are coaxial with aforesaid fundamental body.

It is, of course true of the propeller bodies, that in the case of such parabolic or curved lines, any one point therein is nearer to or farther from the axis of rotation than any preceding point, depending on the direction from which we figure. The rotation of the body takes place under the water, and it is evident that, because of the friction between the fluid and the surface of the body, a certain mass of water is dragged along in the rotation, and that consequently, due to the centrifugal force, said mass of water has a tendency to displace itself along the external surface of the body and to pass from its section in which the radius of the circumference section has one value, to an adjacent section in which the radius has a greater value. Such displacement along the surface occurs along a spiral line, both owing to the adherence of the movable mass of water to the rotating surface, and owing to the presence of the surrounding water.

Now, before proceeding further, in order to render the present specification easily intelligible, reference is had to the accompanying drawing in which similar letters of reference denote similar parts throughout the several views.

Figure 1 is a side elevation of a vessel showing the rotating bodies in operative position.

Figure 2 is an enlarged view of a practical propeller made according to the present invention and embodying the principles and features thereof.

Figure 3 is a side elevation of the same propeller.

Figure 4 is an example of the outline of the profile of the propeller, showing the differences in the curvature of said profile.

Figures 5 and 6 are elevations, particularly in section of such propellers or bodies of revolution adapted to be placed at the stern and bow of a vessel, respectively.

Figure 7 is an end view of another very practical form of the propeller.

Figure 8 is an elevation of the propeller of Figure 7.

Figure 9 is an end view of another modification which is also a practical form of the propeller.

Figure 10 is a side elevation of the form shown in Figure 9.

Now during the movement of the water along the mentioned spiral line, the same is urged from the mass in the rear toward the peripheral points of the body in Figure 2. In the meantime it is appropriate to consider two cases, viz. in (a) the propelling device does not present a passage in correspondence to its rotation axis, when the revolution body has been generated by a line which starts from a point of the axis; and in (b) the propelling device presents such a passage when the revolution body has been generated by a line which does not start from the rotating axis. In the first occurrence the mass of water in annular form is moved to the mouth of greater dimension of the rotating body and is forced to leave said body, and this mass of water produces a forward thrust in line with the axis of rotation. However, as the periphery of this so-called mouth is arranged in a vertical plane and completely submerged, the different points thereof are submitted to slightly different hydrostatic pressures due to their differences in depth below the water level. If then the rotating body is submerged in shallow water so that the differences between hydrostatic pressures at the upper and lower horizontal tangents are considerable, the annular mass of water will tend to more easily leave the rotating body adjacent to the upper horizontal tangent than at other lower points of the body. The water thus leaves the rotating body in a manner which is not quite uniform, and according to the direction of rotation of said body, a directional component of the upper horizontal tangents to the mouth of the rotating body is obtained, producing also a lateral thrust in respect to the axis of rotation. In the second aforesaid occurrence (b) and for the same reasons, the mass of water on which the propeller acts is double, i. e. one exterior mass and one interior to the revolution body; consequently it is also true that in addition to the condition which arises in the first occurrence, that a very strong flow of water is compelled to enter the smaller opening of the device and to leave the device by the greater opening, and this occurs in addition to the movement of the exterior mass of water which also flows externally to the rotating body. In this occurrence, however, the thrust caused by said internal flow is of such power that the differences in hydrostatic pressure do not influence the working of the device which acts only as a propeller in the direction of the rotating axis.

Figures 2 and 3 serve to illustrate the propeller body in a practical form, whose outer shell 15 is preferably of a profile generated by rotation of an arc or curved line $a-a'$ about the axis of shaft 7. The hub 16 serves the twofold purpose of securing the outer shell 15 upon shaft 7 and also connect the same with the inner propeller member 14, the two being also connected by the radial ribs or partitions 11, 11. Upon the ribs the shell is divided into the narrow bands similar to 2, providing open areas similar to 9 for taking in water or other fluid from the direction of arrow 10. Now, the profile of the propeller members 14 and 15 may be hemispherical, but may preferably be developed by rotation of a semi-parabola or similarly curved line about the axis of shaft 7. Such a line is illustrated in Fig. 3 and may resemble the trajectory of a bullet when fired, but if considered with respect to the axis of the propeller, it may be described as a curved line which is intersected at two points by a straight line and in which the successive points are each more distant than the preceding from the rotation axis, one extremity of the line terminating substantially at a tangent substantially parallel with said axis. The curved line thus described is that alluded to hereafter in the appended claims.

Noting particularly the curve of Fig. 3, we may imagine rotation of a propeller having such a profile as from V to K and upward to the junction with vertical line B. The water in contact with the surface will be flung outward by centrifugal force and will suck the water which is in front of the vertex V, so as to give the revolution body an impulse in the direction of the arrow H, which sucked water will be caused by centrifugal force to flow outward at the vertex and then simultaneously follow the surface around a curve, and finally be left behind in the direction of the arrow $t$. The whole curvature is actually streamline up to line B, so that it may be stated that the profile of the propeller practically amounts to a streamline head which breaks off abruptly at its greatest diameter where its tangents would be substantially parallel with axis 7—H.

Minutely considered, it is easy to see that when we take two spaced points M—N on the curve near the vertex, the difference in radial distance between $r_n$ and $r_m$ will be $d$, the actual radial distance traveled by the water while passing along the curve surface from vertex V. When having passed along farther toward B, the same distance M'—N' along the curve shows a smaller radial difference between radii $r_{n'}$—$r_{m'}$ at $d'$, the distance traveled outward by the water at that point. At the junction of the curve with line B, the centrifugal travel of the water becomes practically nil, hence it is clear that a true streamline effect is had when considering the penetration of a propeller with such a profile through the water. The interior ribs simply form a means to force some of the water to rotate with the propeller.

The mentioned parabolic or curved lines thus determine the longitudinal profile of the rotating bodies under consideration, the axis of rotation being submerged in the fluid wherein the bodies are intended to operate and be substantially parallel with the surface of such fluid and hence generally horizontal, as already indicated.

The axial motion imparted to the axis is the result of the following mechanical and scientific principles. Rapid rotation of the axis will cause circular motion of the fluid in the vicinity of the rotating body of revolution by virtue of the friction existing between said body and the fluid. Said fluid is thereby subjected to a centrifugal force which causes the fluid to move over the surface of the rotating body from a position near the axis to a position at a greater distance from said axis. The fluid then leaves the surface of the rotating body tangentially creating a reactive force in opposite direction and the axial component of this force is effective to produce the above mentioned motion.

Furthermore the movement of the fluid along the surface of the rotating body will tend to create a vacuum in the space in front of said body near the vertex thereof, this vacuum will result in a suction force which will also be effective in producing the aforementioned axial motion.

Since masses will leave a rotating body at the point of least resistance it follows that the rotating fluids will leave said rotating body at a point where the fluid pressure is least. In other words the fluid will leave the body along a tangent near the uppermost part of its surface, the horizontal component of such a force will be normal to the axis and will produce a means for steering the vessel without retarding the same.

The vertical longitudinal plane of the vessel may have one or two sets of propellers placed symmetrically with respect thereto. There may be one or a pair of forward propellers similar to 2, which are positioned near the bow of the vessel, while a similar pair of after propellers as indicated at 3 which are placed somewhat aft of midship. The motion of the vessel is toward the right of the drawing.

Forward rotating body 5 is placed near the bow of the vessel and rotates about a horizontal axis which is in the mentioned vertical plane, while the after rotating body 6 is positioned near the stern of the vessel and also rotates about a horizontal axis in said plane.

Each of these rotating bodies is in the form of a hollow hemisphere mounted upon a propelling shaft 7. Rotating body 6 has the shaft 7 attached to its outer surface, see Figure 2, and rotating body 5 has the shaft 7 affixed to its inner surface as shown in Figure 3. The transverse section of the walls of bodies 5 and 6 may be ascertained by the calculation of resistances and will be determined by the conditions under which they are to be used.

The rotating body may be generated by a quarter circle a—b as in Figures 5 and 6. But since the basic principles of the invention apply also to the inner surface of the rotating body it has been found advisable to cut openings 9 in said hollow hemisphere, see Figures 9 and 10. The fluid will now pass through the openings 9 in the direction of the arrow 10 and the device will now be fastened to the shaft 7 by means of spokes 11.

In the modification of this invention shown in Figures 7 and 8 the spokes 11 are replaced by external ribs or blades 12. It should also be understood that such blades may also be placed internally as well.

To raise the force or effect of these rotating devices it is necessary that a larger mass of fluid be rotated, this may be effected by increasing the friction between the fluid and the rotating device. The preferred form of this device as shown in Figures 11 and 12 is therefore provided with corrugations 13 both externally and internally. But it is to be understood that the surface may be altered in any way to effect this increase in friction. These corrugations are all placed upon the surface radially and not helically, since their sole object is the increase of friction between the fluid and the rotating surface.

Figures 3, 8, 9 and 10, respectively illustrate most clearly the principle here involved, namely, that the blades, paddles or ribs, as they may be variously termed, first of all have various cross section profiles, the preferred sinusoidal form being repeated about a circle instead of indulating above and below a straight line as is ordinarily the case. These ribs are arranged in planes which simultaneously coincide with the axis of the rotating body and are radially projected from said axis, while the longitudinal profiles of said ribs in said radially disposed planes are generated from parabolic or curved lines, as already indicated. Due to the fact that these ribs are pitchless and coincide with the mentioned axial and radial planes, the direction or rotation of the rotary body involved is an entirely indifferent matter, when we merely consider the travel of the body through the fluid. When turning at high speed in either direction the body will nevertheless advance along its axis in the same forward direction, driving its vertex ahead through the fluid. Of course, in combination with propellers of ordinary type and other adjacent structures, the direction of rotation may have to be definitely predetermined. The actual form of the transverse profile of the ribs may also operate more efficiently in one direction of rotation than in the other. Generally, then, the rotary body with ribs (Figures 2, 3, 9 and 10) may be considered reversible without loss or appreciable change in effect, as this point is based on the well known effect of centrifugal force.

It is also to be understood that several such rotating bodies could be placed upon the same shaft, all generated from different curves and having openings near the vertices thereof, it being desirable of course that successive points along such a propelling device would be at increasingly greater distances from the shaft. It is also obvious that radial blades or fins may extend both externally and internally along the surfaces of such a combined propelling device.

Since many modifications and many embodiments of this invention could be effected, the drawing and this description are to be construed as illustrative and not in a limiting sense.

Having now fully described my invention, I claim:—

1. A high speed centrifugal propeller including a hollow rotatable body having a drive shaft secured at the vertex thereof and providing an axis of rotation therefor, which hollow body has a form generated by a curved line lying in a plane coinciding with the axis of said shaft and rotated upon said axis.

2. A high speed centrifugal propeller including a rotatable, hollow hemispherical body having a drive shaft secured at the vertex thereof and providing an axis of rotation therefor, which hollow body has a form generated by an arcuate line lying in a plane coinciding with the axis of said shaft and rotated upon said axis.

3. A high speed centrifugal propeller including a rotatable, hollow paraboloid shell having a drive shaft secured at the vertex thereof and providing an axis of rotation therefor, which hollow shell has a form generated by a semi-parabola lying in a plane coinciding with the axis of said shaft and rotated upon said axis, said semi-parabola having one extremity terminating at a point where a tangent thereto is substantially parallel with said axis.

4. A high speed centrifugal propeller including, in combination, a hollow rotatable body forming in profile a streamline head and segmented adjacent the vertex thereof and provided with a plurality of pitchless ribs joined at the vertex of said body, and a drive shaft secured to said ribs providing an axis of rotation for said body.

5. A high speed centrifugal propeller including, in combination, a hollow rotatable body segmented adjacent the vertex thereof and provided with a plurality of interior ribs joined at the vertex of said body, a drive shaft secured to said interior ribs providing an axis of rotation for said body, and a plurality of radially projecting exterior ribs disposed upon said body in order to positively grip the fluid adjacent said body in which the latter is rotated.

6. A high speed centrifugal propeller including, in combination, a hollow rotatable body segmented adjacent the vertex thereof and provided with a plurality of interior ribs joined at the vertex of said body, a drive shaft secured to said interior ribs providing an axis of rotation for said body, and a plurality of radially projecting exterior ribs disposed beyond the profile outline of said interior ribs upon said body in order to positively grip the fluid adjacent said body in which the latter is rotated.

7. A high speed centrifugal propeller including, in combination, a hollow rotatable body segmented adjacent the vertex thereof and provided with a plurality of interior ribs joined at the vertex of said body, a drive shaft secured to said interior ribs providing an axis of rotation for said body, and a plurality of radially projecting ribs disposed beyond the profile outline of said interior ribs upon said body in order to positively grip the fluid adjacent said body in which the latter is rotated, said interior ribs and projecting ribs having a continuous profile outline which is a curved line lying in a plane coinciding with the axis of said shaft, said curved line terminating at a point where a tangent thereto is parallel with said axis.

8. A high speed centrifugal propeller including, in combination, a hollow rotatable body having a drive shaft secured at the vertex thereof and providing an axis of rotation therefor, which hollow body has a form generated by a semi-parabolic line lying in a plane coinciding with the axis of said shaft and rotated upon said axis, and a plurality of radially projecting blades disposed upon said body in order to positively grip the fluid adjacent said body in which the latter is rotated.

9. A high speed centrifugal propeller including, a rotatable hollow body structure consisting of a plurality of connected blades provided with a common drive shaft and both projecting radially therefrom, which hollow body structure as a whole has a form generated by a plurality of mutually generally parallel curved lines lying in any one of said planes and rotated about said axis.

10. A high speed centrifugal propeller including, in combination, a drive shaft, and a plurality of spaced hollow rotatable bodies mounted in a series upon said drive shaft at the vertices thereof and each having individually a form generated by a curved line lying in a plane coinciding with the axis of said shaft and rotated upon said axis, said curved line having one extremity terminating at a point where a tangent thereto is substantially parallel with said axis.

11. A high speed centrifugal propeller including, in combination, a drive shaft having blades disposed thereon, each of which blades consists of a succession of portions of a corresponding number of spaced hollow rotatable bodies mounted upon the shaft at their vertices and individually having a form generated by a curved line lying in a plane coinciding with the axis of said shaft and rotated thereon, each part of each blade forming a portion of one of said bodies cut along spiral lines described on said bodies, and each of said curved lines having one extremity terminating at a point where a tangent thereto is substantially parallel with said axis.

12. A high speed centrifugal propeller including a hollow rotatable body having a drive shaft secured at the vertex thereof and providing an axis of rotation therefor, which hollow body has a form generated by a curved line each point of which is more distant than all preceding points from the axis of rotation and having one extremity terminating at a point where a tangent thereto is substantially parallel with the axis of the shaft, which line is rotated upon said axis.

13. A high speed centrifugal propeller including in combination, a hollow rotatable body having a drive shaft secured at the vertex thereof and providing an axis of rotation therefor, which hollow body has a form generated by a curved line, each point of which is more distant from the axis of rotation than all the preceding points, which line has one extremity so disposed that the tangent of said point is substantially parallel with said axis and which line lies in a plane coinciding with the axis of said shaft and is rotated upon said axis, and a plurality of radially projecting blades disposed upon said body in order to positively grip the fluid adjacent said body in which the latter is rotated.

14. A high speed centrifugal propeller including, a rotatable hollow body structure consisting of a plurality of connected blades provided with a common drive shaft and both projecting radially therefrom, which hollow body structure as a whole has a form generated by a plurality of mutually generally parallel curved lines lying in any one of said planes and rotated about said axis, each point of which lines is more distant from the axis of rotation than all the preceding points therein, and each of which lines has one extremity thereof so disposed that the tangent of each such point is substantially parallel to said axis.

15. A high speed centrifugal propeller including, in combination, a drive shaft having blades disposed thereon, each of which blades consists of a succession of portions of a corresponding number of spaced hollow rotatable bodies mounted upon said shaft at their vertices and individually having a form generated by a curved line each point of which is more distant from the axis of rotation than all the preceding points, which line has one extremity so disposed that the tangent of each such point is substantially parallel with the axis of rotation, while the line lies in a plane coinciding with the axis of said shaft and is rotated thereon, each part of each blade forming a portion of one of said bodies cut along spiral lines described on said bodies.

LUIGI GHIRARDI.